(12) United States Patent
Yee et al.

(10) Patent No.: US 7,593,057 B2
(45) Date of Patent: Sep. 22, 2009

(54) MULTI-VIEW INTEGRATED CAMERA SYSTEM WITH HOUSING

(75) Inventors: Dawson Yee, Clyde Hill, WA (US); Ross Cutler, Duvall, WA (US)

(73) Assignee: Microsoft Corp., Redmond, WA (US)

( * ) Notice: Subject to any disclaimer, the term of this patent is extended or adjusted under 35 U.S.C. 154(b) by 776 days.

(21) Appl. No.: 10/902,650

(22) Filed: Jul. 28, 2004

(65) Prior Publication Data

US 2006/0023106 A1    Feb. 2, 2006

(51) Int. Cl.
*H04N 5/225* (2006.01)
(52) U.S. Cl. ............... 348/373; 348/36; 348/218.1; 348/39; 348/151; 359/725; 352/69
(58) Field of Classification Search ........... 348/373, 348/335, 36, 218.1, 239; 352/69; 359/725, 359/756, 733
See application file for complete search history.

(56) References Cited

U.S. PATENT DOCUMENTS

| | | | |
|---|---|---|---|
| 2,931,267 A | 4/1960 | Hoch | |
| 3,118,340 A | 1/1964 | Iwerks | |
| 5,023,725 A * | 6/1991 | McCutchen | 348/38 |
| 5,130,794 A * | 7/1992 | Ritchey | 348/39 |
| 5,539,483 A | 7/1996 | Nalwa | |
| 5,745,305 A | 4/1998 | Nalwa | |
| 5,793,527 A | 8/1998 | Nalwa | |
| 5,920,337 A * | 7/1999 | Glassman et al. | 348/36 |
| 5,990,934 A | 11/1999 | Nalwa | |
| 6,005,611 A | 12/1999 | Gullichsen et al. | |
| 6,043,837 A | 3/2000 | Driscoll, Jr. et al. | |
| 6,111,702 A | 8/2000 | Nalwa | |
| 6,115,176 A | 9/2000 | Nalwa | |
| 6,128,143 A | 10/2000 | Nalwa | |
| 6,141,145 A | 10/2000 | Nalwa | |
| 6,144,501 A | 11/2000 | Nalwa | |
| 6,175,454 B1 | 1/2001 | Hoogland et al. | |
| 6,195,204 B1 | 2/2001 | Nalwa | |
| 6,219,089 B1 | 4/2001 | Driscoll, Jr. et al. | |
| 6,219,090 B1 | 4/2001 | Nalwa | |

(Continued)

FOREIGN PATENT DOCUMENTS

GB        2258968 A  *  2/1993

(Continued)

OTHER PUBLICATIONS

Underwater housing for Nikon D-100, last accessed on May 26, 2004 at http://www.ikelite.com/web_pages/2dslr_d100.htm.
Camera UW: Ewa Betacam Housings, last accessed on May 26, 2004 at http://www.camerasunderwater.co.uk/ewa_marine/tv_cine/pages/eng_hsg.html.

(Continued)

*Primary Examiner*—Jason Chan
*Assistant Examiner*—Cynthia Calderon
(74) *Attorney, Agent, or Firm*—Lyon & Harr, LLP; Katrina A. Lyon

(57) ABSTRACT

A panoramic camera design that is lower cost, robust, stable and more user friendly than prior art designs. The camera design makes use of a unified molded structure of optical material to house a mirror, aligned sensor, and lens assembly. The unified molded structure of the camera keeps the sensed optical path enclosed to minimize dust and user's fingers and maintain optical alignment.

28 Claims, 7 Drawing Sheets

Optical sensors aligned with pin structures, mounted beneath solid block (self aligned structure)

U.S. PATENT DOCUMENTS

| | | | |
|---|---|---|---|
| 6,222,683 | B1 | 4/2001 | Hoogland et al. |
| 6,285,365 | B1 | 9/2001 | Nalwa |
| 6,313,865 | B1 | 11/2001 | Driscoll, Jr. et al. |
| 6,331,869 | B1 | 12/2001 | Furlan et al. |
| 6,337,708 | B1 | 1/2002 | Furlan et al. |
| 6,341,044 | B1 | 1/2002 | Driscoll, Jr. et al. |
| 6,346,967 | B1 | 2/2002 | Gullichsen et al. |
| 6,356,296 | B1 | 3/2002 | Driscoll, Jr. et al. |
| 6,356,397 | B1 | 3/2002 | Nalwa |
| 6,369,818 | B1 | 4/2002 | Hoffman et al. |
| 6,373,642 | B1 | 4/2002 | Wallerstein et al. |
| 6,388,820 | B1 | 5/2002 | Wallerstein et al. |
| 6,392,687 | B1 | 5/2002 | Driscoll, Jr. et al. |
| 6,424,377 | B1 | 7/2002 | Driscoll, Jr. et al. |
| 6,426,774 | B1 | 7/2002 | Driscoll, Jr. et al. |
| 6,459,451 | B2 | 10/2002 | Driscoll, Jr. et al. |
| 6,466,254 | B1 | 10/2002 | Furlan et al. |
| 6,480,229 | B1 | 11/2002 | Driscoll, Jr. et al. |
| 6,493,032 | B1 | 12/2002 | Wallerstein et al. |
| 6,515,696 | B1 | 2/2003 | Steinhauer et al. |
| 6,539,547 | B2 | 3/2003 | Driscoll, Jr. et al. |
| 6,583,815 | B1 | 6/2003 | Lomax et al. |
| 6,593,969 | B1 | 7/2003 | Morrow et al. |
| 6,597,520 | B2 | 7/2003 | Wallerstein et al. |
| 6,700,711 | B2 * | 3/2004 | Nalwa ......................... 359/725 |
| 6,738,569 | B1 * | 5/2004 | Sogabe et al. ................. 396/21 |
| 6,741,250 | B1 | 5/2004 | Furlan et al. |
| 6,756,990 | B2 | 6/2004 | Koller |
| 6,865,029 | B2 * | 3/2005 | Kuriyama et al. ........... 359/726 |
| 6,885,509 | B2 | 4/2005 | Wallerstein et al. |
| 6,924,832 | B1 | 8/2005 | Shiffer et al. |
| 7,020,337 | B2 | 3/2006 | Viola et al. |
| 7,031,499 | B2 | 4/2006 | Viola et al. |
| 7,099,510 | B2 | 8/2006 | Jones et al. |
| 7,154,551 | B2 * | 12/2006 | Kuriyama et al. ........... 348/335 |
| 7,197,186 | B2 | 3/2007 | Jones et al. |
| 7,212,651 | B2 | 5/2007 | Viola et al. |
| 7,298,392 | B2 | 11/2007 | Cutler |
| 7,453,509 | B2 * | 11/2008 | Losehand et al. ........... 348/340 |
| 2002/0034020 | A1 | 3/2002 | Wallerstein et al. |
| 2002/0063802 | A1 | 5/2002 | Gullichsen et al. |
| 2002/0094132 | A1 | 7/2002 | Hoffman et al. |
| 2002/0109772 | A1 * | 8/2002 | Kuriyama et al. .............. 348/36 |
| 2002/0154417 | A1 | 10/2002 | Wallerstein et al. |
| 2003/0142402 | A1 | 7/2003 | Carbo et al. |
| 2003/0193606 | A1 | 10/2003 | Driscoll et al. |
| 2003/0193607 | A1 | 10/2003 | Driscoll et al. |
| 2004/0008407 | A1 | 1/2004 | Wallerstein et al. |
| 2004/0008423 | A1 | 1/2004 | Driscoll et al. |
| 2004/0021764 | A1 | 2/2004 | Driscoll et al. |
| 2004/0252384 | A1 | 12/2004 | Wallerstein et al. |
| 2004/0254982 | A1 | 12/2004 | Hoffman et al. |
| 2005/0262543 | A1 * | 11/2005 | Wu ............................. 725/109 |

FOREIGN PATENT DOCUMENTS

| | | | |
|---|---|---|---|
| JP | 06141211 A | * | 5/1994 |
| JP | 08-125835 A | | 5/1996 |

OTHER PUBLICATIONS

Rui, Y., A. Gupta and J. J. Cadiz, Viewing meetings captured by an omni-directional camera, *CHI 2001*, vol. 3, No. 1, pp. 450-457, Mar. 31-Apr. 5, 2001.

Rui, Y., L. He, A. Gupta and Q. Liu, Building an intelligent camera management system, *Proc. of ACM Multimedia '01*, Ottawa, Sep. 30-Oct. 5, 2001.

Greiffenhagen, M., V. Ramesh, D. Comaniciu, and H. Niemann, Statistical modeling and performance characterization of a real-time dual camera surveillance system, *IEEE Conf. Comp. Vision and Pattern Recognition (CVPR'00)*, 2000, vol. 2, 335-342, Jun. 13-15, 2000.

Image stabilizer system, last accessed on May 26, 2004 at http://www.canon.com/technology/detail/digi_video/shakecorrect_shift.

Kostas, D., Welcome to the page of omnidirectional vision, last accessed on May 12, 2004 at http://www.cis.upenn.edu/~kostas/omni.html.

Hicks, R. A., Catadioptric sensor designs by R. Andrews Hicks, last accessed on May 12, 2004 at http://www.cs.drexel.edu/~ahicks/design/hicks-designs.html.

Columbia University, Omnicamera: Omnidirectional video camera, last accessed on May 12, 2004 at http://www1.cs.columbia.edu/CAVE/omnicam.

Pless, R., New technologies, last accessed on May 12, 2004 at http://www.cs.wustl.edu/~pless/camera.hmtl.

Argyros, A., Robot homing based on panoramic vision, last accessed on May 12, 2004 at http://www.ics.forth.gr/~argyros/research/pan_homing.htm.

Omnidirectional vision, last accessed on May 12, 2004 at http://cmp.felk.cvut.cz/demos/OmnidirectionalVision.html.

The VAST lab: Vision and software technology laboratory, Lehigh University, last accessed on May 12, 2004 at http://www.eecs.lehigh.edu/~vast.

The Atacama Desert trek, last accessed on May 12, 2004 at http://www-2.cs.cmu.edu/afs/cs/project/lri-13/www/atacama-trek/.

Fiala, M., Research, last accessed on May 12, 2004 at http://www.cs.ualberta.ca/~fiala.

Larson, S., Eyes from eyes: Towards a new, biologically motivated, camera technology, last accessed on May 12, 2004 at http://www.cfar.umd.edu/~larson/EyesFromEyes.hmtl.

Srinivasan, M. V., J. S. Chahl, M. A. Garratt, A. Mitzutani, D. Soccol and G. Ewyk, Biorobotic vision laboratory, last accessed on May 12, 2004 at http://cvs.anu.edu.au/bioroboticvision.

Office of the future, last accessed on May 12, 2004 at http:///www.cs.unc.edu/Research/stc.

Taylor, C. J., VideoPlus, last accessed on May 12, 2004 at http://www.cis.upenn.edu/~cjtaylor/projects/VideoPlus/VideoPlus.html.

Stiefelhagen, R., J. Yang, A. Waibel, Modeling focus of attention for meeting indexing, *ACM Multimedia '99*, Oct. 1999, Orlando, Florida, pp. 3-10.

Zheng, J. Y., and S. Tsuji, Panoramic view, last accessed on May 12, 2004 at http://www.cs.iupui.edu/~jzheng/panorama.html.

Dersch, H., Panoramas and objectmovies in PDF-documents, last accessed on May 12, 2004 at http://webuser.fh-furtwangen.de/~dersch/pdfpanorama/Readme.html.

Lacriox, S., and J. Gonzalez, Robotics in natual environments—LAAS/CNRS, last accessed on May 12, 2004 at http://www.laas.fr/~simon/eden/rover/perception/pano.php.

Ulrich, I., I. Nourbakhsh, Appearance-based place recognition for topological localization, last accessed on May 12, 2004 at http://www-2.cs.cmu.edu/~iwan/localization.htm.

Digital Photography, last accessed on May 12, 2004 at http://www.digitalphotography.org.

Robot team, last accessed on May 12, 2004 at http://w3.sys.es.osaka-u.ac.jp/projects/robot/index-e.html.

Frintrop, S., I. Stratmann, E. Rome, and V. Becanovic, Omnidirectional imaging for robotic applications, last accessed on May 12, 2004 at http://www.ais.fraunhofer.de/services/OmniVision/omni-intro.html.

Stereo Omnidirectional System, last accessed on May 12, 2004 at http://www.viewplus.co.jp/products/sos/sos_english/sos_main_english.html.

Introducing the 0-360 Panoramic Optic, last accessed on May 12, 2004 at http://www.0-360.com.

360-degree Products, last accessed on May 12, 2004 at http://www.remotereality.com/vtprod/index.html.

Be Here Corporation, last accessed on May 12, 2004 at http://www.behere.com.

Egg Solution Photo 360° Product, last accessed on May 12, 2004 at http://www.eggsolution.com/prod_photo.htm.

Circarana photographic unit, last accessed on May 12, 2004 at http://cinerama.topcities.com/circarama.htm.

* cited by examiner

Optical sensors aligned with pin structures,
mounted beneath solid block (self aligned structure)

MULTI-VIEW INTEGRATED CAMERA SYSTEM WITH HOUSING

BACKGROUND

1. Technical Field

This invention is directed toward a new camera design. More specifically, this invention is directed toward a new omni-directional camera design that makes use of a unified molded structure of optical material to house a mirror, aligned sensor, and lens assembly.

2. Background Art

Video conferencing systems have had limited commercial success. This is due to many factors. In many cases video conferencing systems are too expensive for individuals and small businesses to afford. Additionally, there are numerous technical deficiencies in the video conferencing systems to date. Poor camera viewpoints and insufficient image resolution make it difficult for meeting participants to see the person speaking. This is compounded by the fact that many camera systems are difficult for the user to operate. Cameras for video conferencing systems are sometimes very delicate and can be damaged by an untrained user trying to adjust the camera system.

Although advances have been made in camera designs for video conferencing, especially in the area of using panoramic camera designs, these designs are often expensive, fragile, unstable and not very user friendly.

SUMMARY

The invention is directed towards a camera design and process that overcomes the aforementioned limitations in videoconferencing cameras by employing a panoramic camera design that is lower cost, robust, stable and more user friendly than prior art designs. The camera design of the present invention makes use of a unified molded structure made of optical material to house a mirror, aligned sensor, and lens assembly. The unified molded structure of the camera keeps the sensed optical path enclosed to minimize dust and user's fingers and maintain optical alignment.

A single block structure of optical material houses one or more mirrored (preferably back-mirrored) surfaces, lens elements, and contains sensor alignment surfaces for aligning the one or more sensors with associated lens elements. The sensor alignment surfaces are basically holes cut out or molded into the block structure for receiving and aligning the mirrored surfaces and the lens elements, as well as the sensor surfaces. In one embodiment of the invention, pins are mounted into the block structure to further align the sensor with the lens and mirror elements. Prior art designs do not have these pieces integrated into a unified structure such as a block, and hence are fragile and difficult to align. The present invention makes use of optical materials such as glass or plastics for molding, surfacing, holes and features for alignment.

One embodiment of the invention is an improvement over the camera system described in co-pending patent application Ser. No. 10/608,363, entitled "OMNI-DIRECTIONAL CAMERA DESIGN FOR VIDEO CONFERENCING", filed on Jun. 26, 2003. This camera system of the invention uses N cameras and an N sided mirror to capture images of the surrounding scene. The images from the N cameras are stitched together to create a 360-degree panorama using a calibration surface. The camera system according to the invention improves on this prior camera design in that the mirrors, lenses and sensors are housed and aligned within a unified substantially solid block housing of optical material.

In another embodiment of the invention the cameras of the camera array have an up look angle to have a more usable vertical field of view as is described in the aforementioned co-pending patent application to image more of the meeting participants and less of the conferencing table. This configuration maximizes the use of the imaging sensors, further reducing cost of the system. More specifically, cameras with a smaller vertical field of view can be used as almost the entire field of view captures the video conference participants' faces and not extraneous data such as the surface the camera is sitting on. The up look angle can be implemented by tilting each camera (e.g., each lens sensor pair) as is described in the co-pending application. However, the upward tilt angle can also be implemented by having a prism on the external (vertical) surface or the internal (horizontal) surface of the optical block housing. This second method of obtaining the up look angle allows the camera sensors to be mounted flat on a Printed Circuit Board (PCB), which reduces complexity, cost, and calibrations. Some chromatic aberration is induced (on the order of a pixel width), but this can be corrected via image processing.

In one embodiment of the invention, the N-sided mirror is used to create a camera array with a very small distance D between the virtual centers of projections of the cameras in the array. The virtual centers of projection for each camera need not be identical, but can be offset. If the centers of projection are moved away from the mirror's axis of symmetry, then the horizontal field of view can be larger than 360/N, where N is the number of cameras. When the centers of projection are moved away from the mirror's axis of symmetry, then the field of view can widen so there is overlap between the cameras. This is desirable so that the images the cameras capture overlap.

In yet another embodiment of the camera design of the present invention the optical block housing is not of unitary design. The housing is similar to that previously described but is assembled from sections of optical material. This design can be easier to fabricate.

Thus, the camera system and method according to the invention is advantageous in that it is lower cost, stable and more user friendly than prior art designs. Furthermore, the unified molded structure of the camera keeps the sensed optical path enclosed to minimize dust and user's fingers and maintain optical alignment. The substantially solid housing also provides strength and prevents the mirror, lens and sensor alignment from being disturbed.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
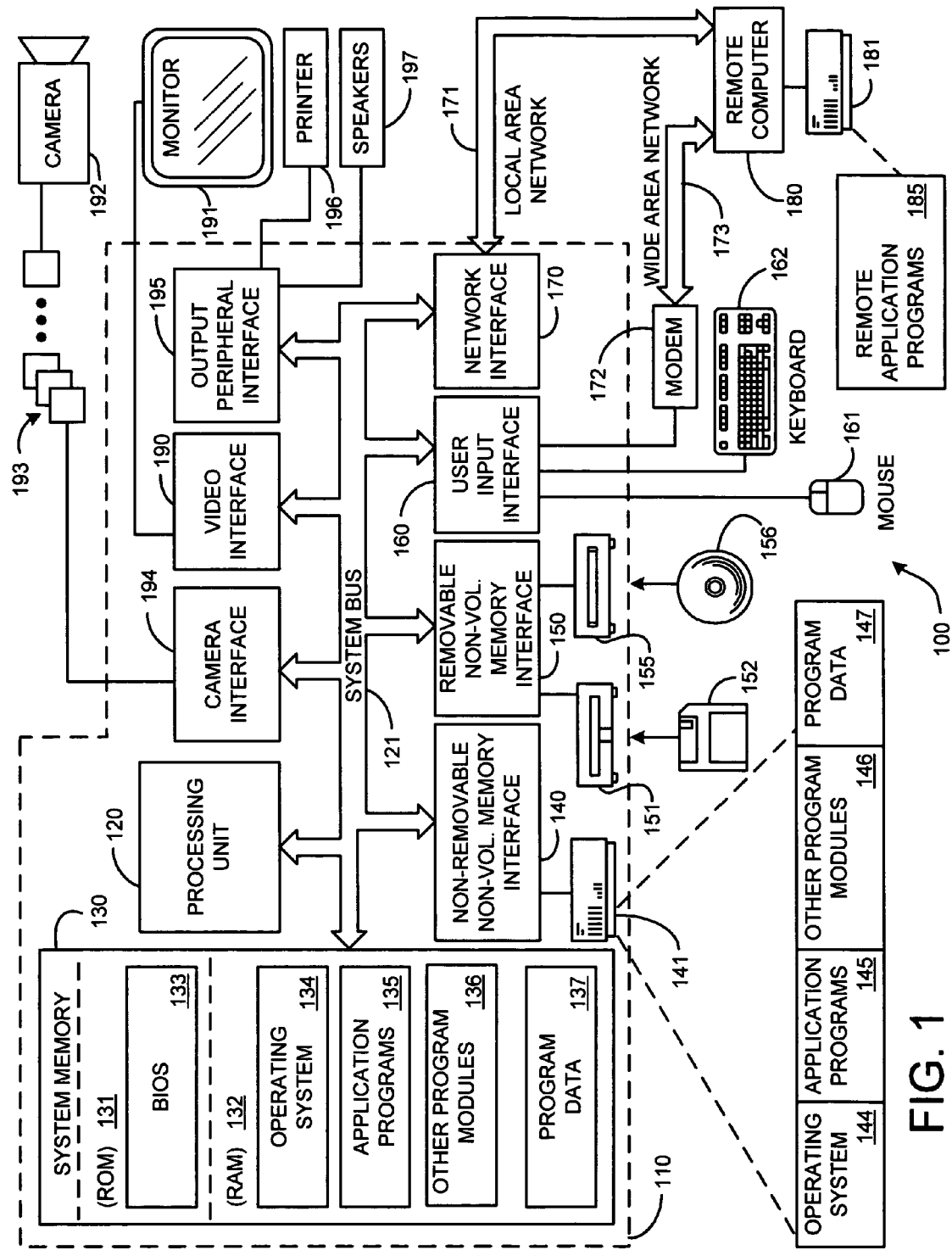
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Multi-View Integrated Camera System.

The following sections describe the camera system according to the invention, to include the unified molded housing, alignment surfaces and alignment structures and the camera system geometry.

2.1 Unified Molded Housing and Alignment Surfaces and Structures.

One embodiment of the invention is an improvement over the camera system described in co-pending patent application Ser. No. 10/608,363, entitled "OMNI-DIRECTIONAL CAMERA DESIGN FOR VIDEO CONFERENCING", filed on Jun. 26, 2003. This camera system of the invention uses N cameras and an N sided mirror to capture images of the surrounding scene. The images from the N cameras are stitched together to create a 360-degree panorama using a calibration surface. The camera system according to the invention improves on this prior camera design in that the mirrors and camera lenses and sensors are housed and aligned within a unified substantially solid block housing of optical material.

Figure 2:
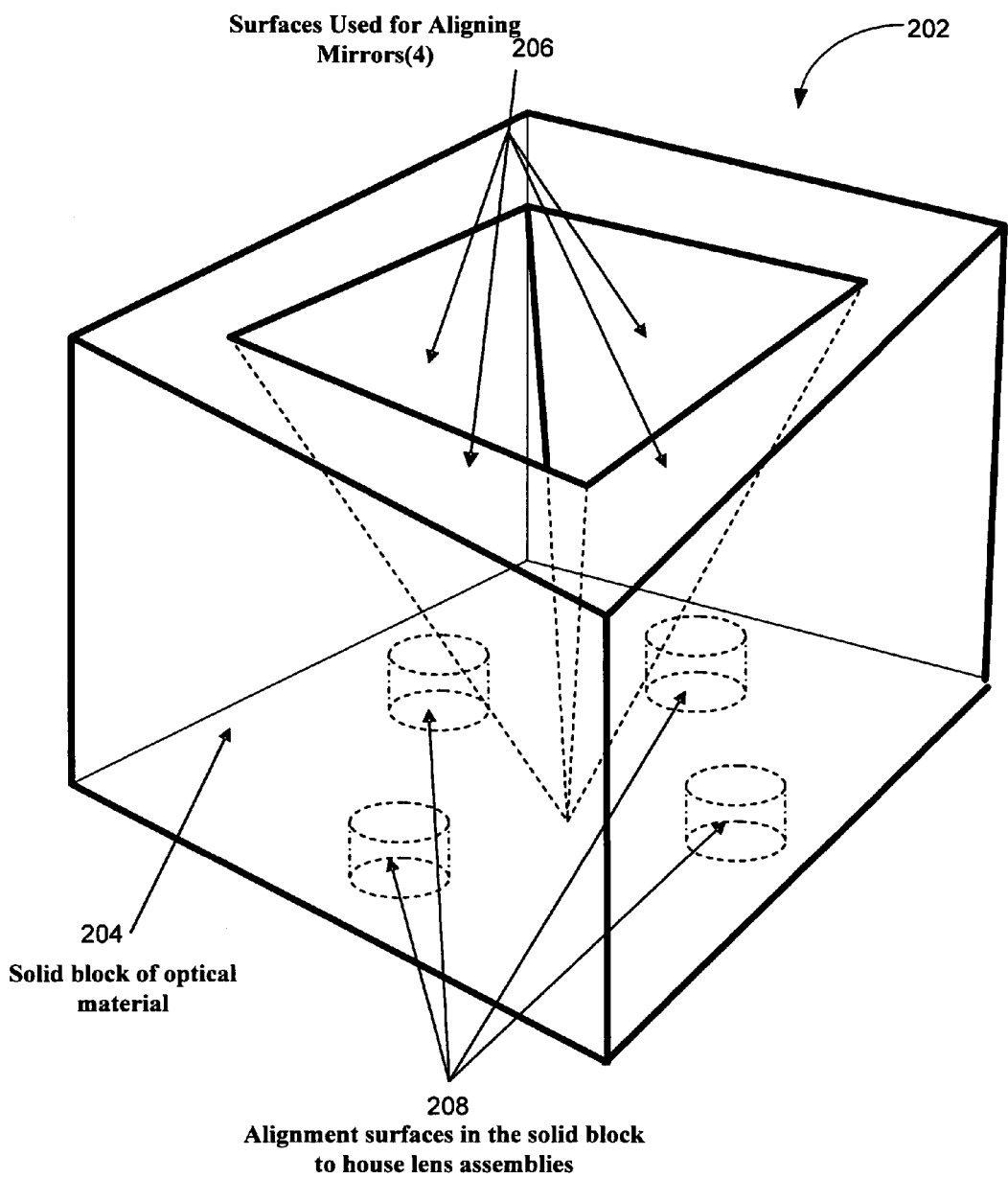
FIG. 2 is a diagram depicting a camera and mirror system according to one embodiment of the invention. The optical path is totally enclosed within the solid block and is thus free from dirt, dust and user's fingers.

An exemplary embodiment 202 of the housing 204 of the camera system of the invention is shown in FIG. 2. The camera design of this embodiment makes use of a unified molded structure 204 made of optical material to house one or more mirrored surfaces or mirror pieces that are aligned with surfaces 206, and sensor alignment surfaces 208. It should be noted that the surfaces 206 could be coated with a reflective material which eliminates the need for separate mirror pieces. The sensor alignment surfaces 208 are basically holes cut out or molded into the block structure 204 for receiving and aligning each lens element with its associated sensor surface. The housing, 204, can be made of any optical material such as, for example, glass or plastic.

Figure 3:
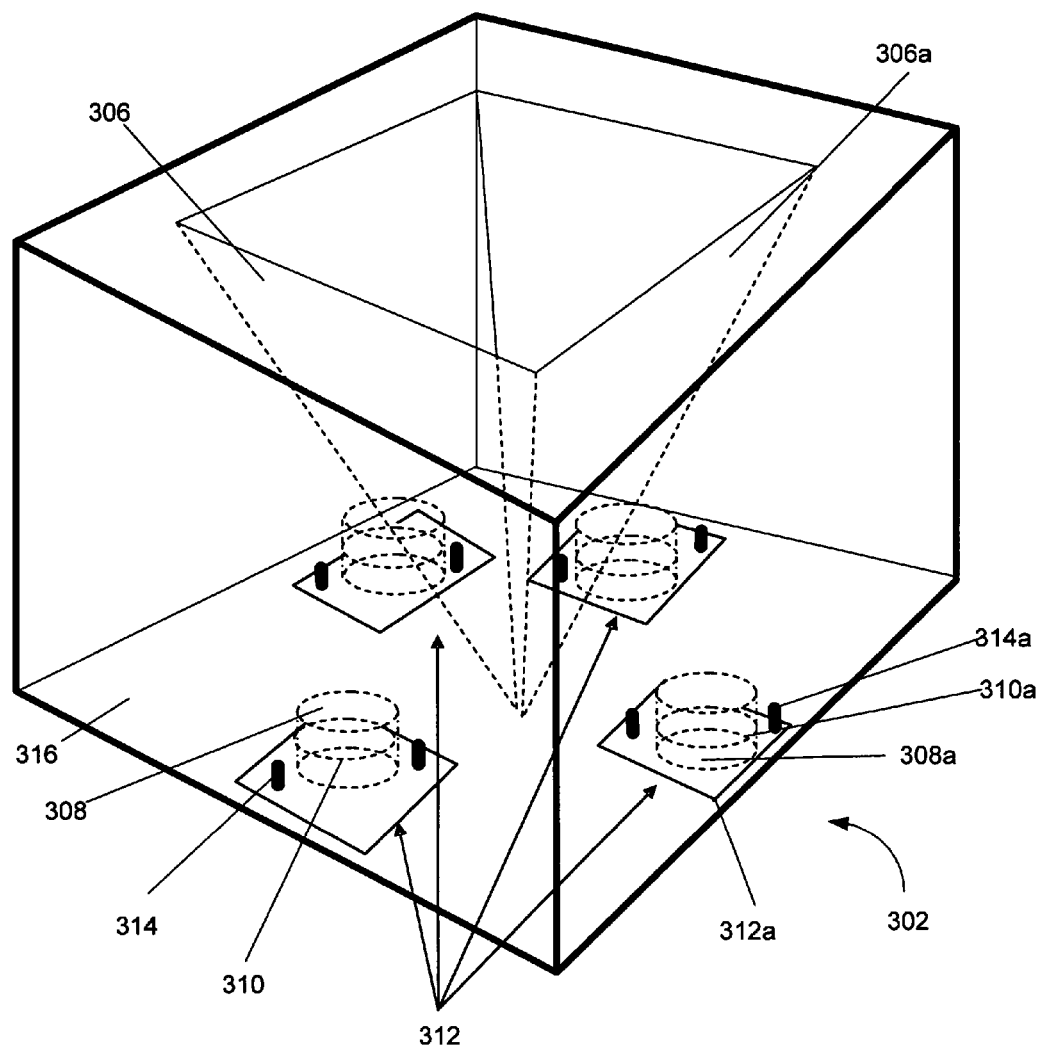
FIG. 3 is a diagram depicting a camera and mirror system within an optical block according to one embodiment of the invention. In this exemplary embodiment each optical sensor is aligned with its respective lens with pin structures mounted beneath the solid plastic block thereby creating a self-aligned structure.

FIG. 3 shows an exemplary embodiment of the camera system of the invention where each mirrored surface 306 is aligned via each sensor alignment surface 308 to reflect an image to a lens 310 to the sensor 312. Each aligned sensor 312 and lens assembly pair 310 can be considered as a camera of a camera array. In one embodiment of the invention the optical sensors can be further aligned with pin structures 314 mounted beneath the solid block.

Figure 4:
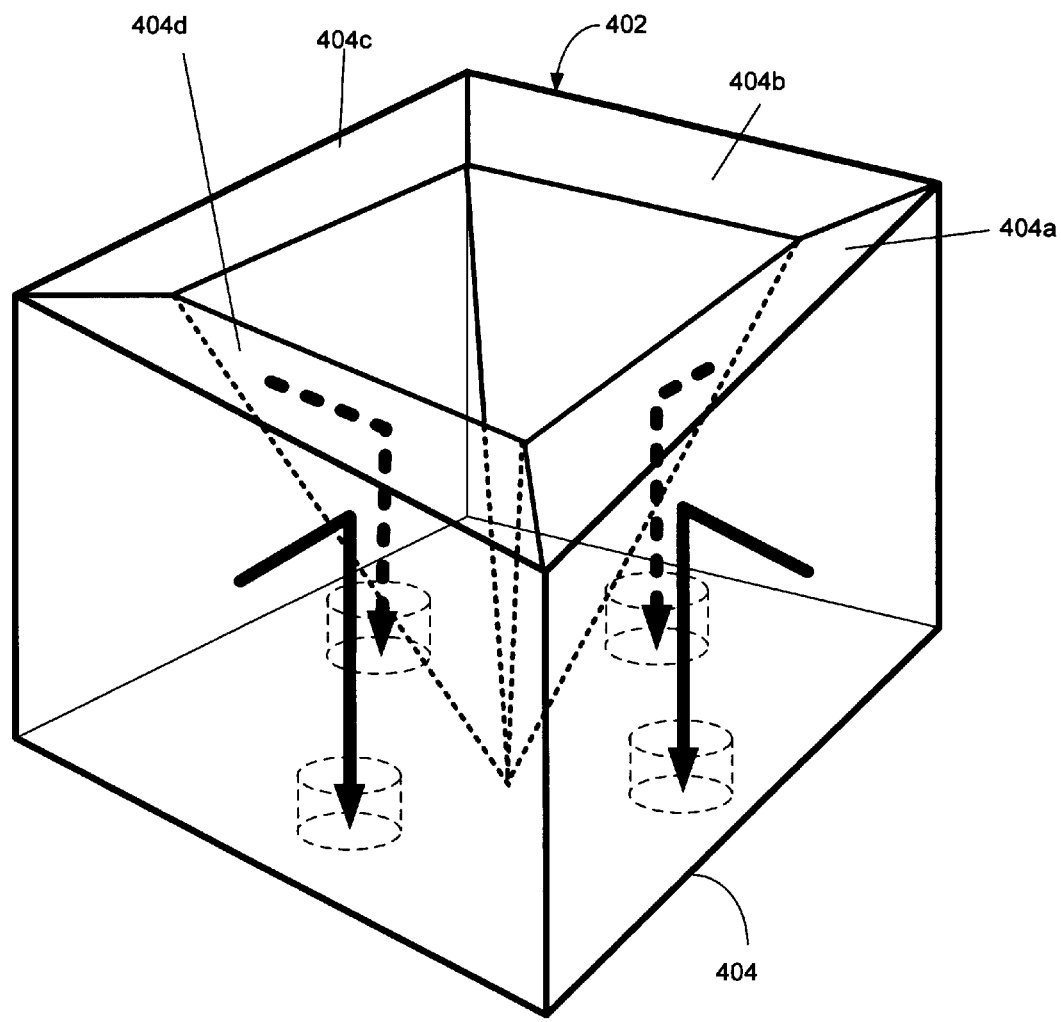
FIG. 4 is a diagram depicting an embodiment of the invention wherein the block housing is composed of solid sections of optical material that are joined together.

FIG. 4 shows yet another exemplary embodiment 402 of the camera system of the invention wherein the housing block 404 is non-unitary. The housing made of optical material is similar to that previously described but is assembled from sections of optical material. For example, sections 404a, 404b, 404c, 404d are assembled to create the block housing.

It should be noted in all of the aforementioned embodiments of the invention that the surfaces of the housing block do not necessarily have to be planar, but could be curved instead.

2.3 Camera/Reflective Surface Geometry.

This section is provided in order to describe geometries of the camera component configurations housed within the housing block of the present invention. It should be noted that any type of camera could be encased in the housing of optical material as long as the housing configuration provides the desired optical path.

As mentioned previously, the camera design of one embodiment of the invention employs N cameras and an N sided mirror. FIG. 3 depicts an embodiment of the camera system wherein a 4-sided mirror 306 is used. Different numbers of mirrors/reflective surfaces and cameras can be used, as long as there is a one-to-one correspondence for each camera-mirror pair. In FIG. 3, camera (e.g. lens 310a and sensor 312a) is aligned with mirror side 306a. Each camera captures the image that is reflected in its corresponding mirror or reflective surface. The images captured by the N cameras are stitched together to create a 360-degree panorama. To stitch the images together in real-time, a conventional static image stitcher can be used, which stitches images together perfectly for objects on a calibration surface. The calibration surface is typically defined by the boundary of the table the camera is on.

Figure 5:
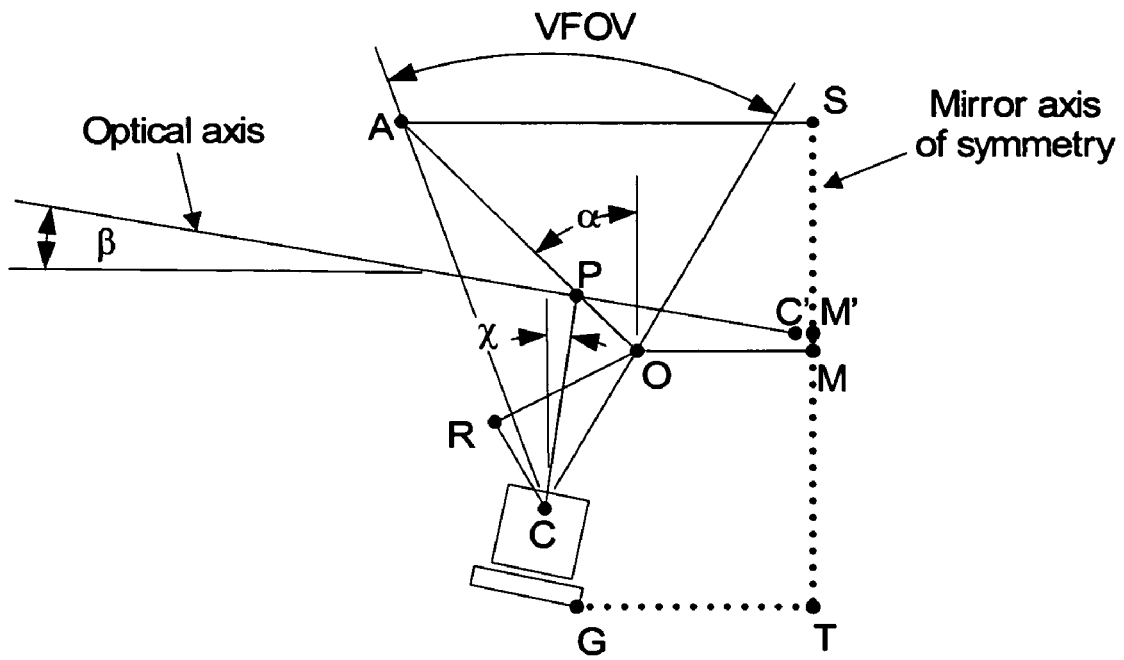
FIG. 5 is a diagram depicting a camera and mirror system. A single camera is shown with center of projection C with virtual center of projection C'.
Figure 6:
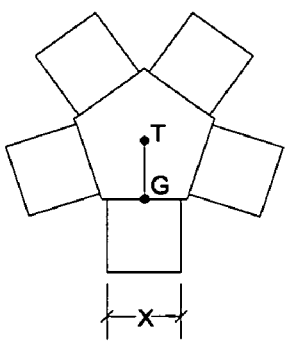
FIG. 6 is a diagram depicting a top view of the base of packed camera sensors. The sensor chip width is X.
Figure 7:
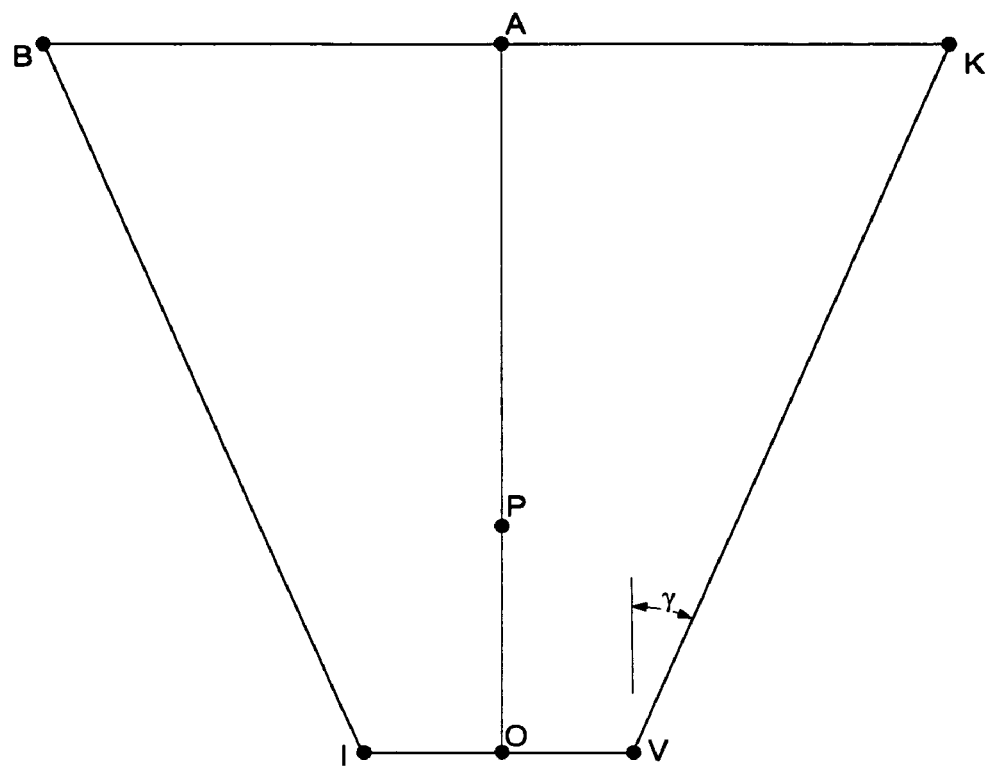
FIG. 7 is a diagram depicting a mirror facet design for the embodiment shown in FIG. 5.
Figure 8:
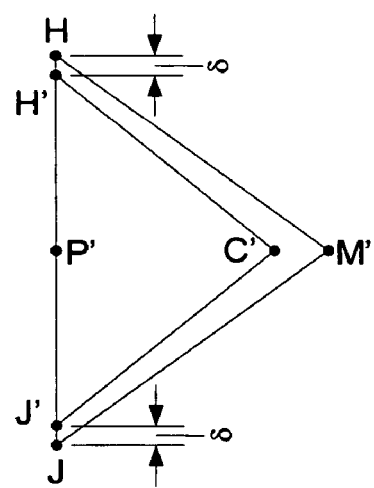
FIG. 8 is a diagram depicting a cross section of mirror through the points P', C', and M'.

The geometry of the camera configuration of one exemplary embodiment of the invention employing 4 mirrored surfaces and 4 cameras can be described by the variables shown in Table 1, FIGS. 5, 6, 7 and 8, and the equations below. As mentioned above, different numbers of mirrors/reflective surfaces and cameras can be used, as long as there is a one-to-one correspondence for each camera-mirror pair and the housing is shaped to appropriately enclose all surfaces and provide the desired optical path. In this embodiment, for example, the housing would be shaped as a pentagon. The camera/sensor configuration in this embodiment is substantially similar to that to that described in co-pending application Ser. No. 10/608,363. The variables in Table 1 correspond to the FIGS. 5, 6, 7 and 8. FIG. 6 is a diagram depicting the base of packed camera sensors. The sensor chip width is X.

TABLE 1

Variables used in FIGS. 5, 6, 7 and 8.

| Parameters | Description |
|---|---|
| α | Angle of the mirror face and the vertical |
| χ | Angle of optical axis from camera with respect to the vertical |
| β | Angle between optical axis from mirror and the horizon |
| A | Midpoint on top edge of mirror facet |
| AS | Inner radius of top mirror |
| BS | Outer radius of top mirror; radius of the camera head |
| C | Center of projection of camera |
| C' | Virtual center of projection of camera |
| CR | Distance between lowest incoming ray and C; used to check self-occlusion |
| D | Distance between adjacent camera's center of projection (DBACCOP) |
| G | Midpoint on edge of image sensor inner side |
| IV | Length of bottom mirror edge |
| BK | Length of top mirror edge |
| HFOV | Horizontal field of view |

TABLE 1-continued

Variables used in FIGS. 5, 6, 7 and 8.

| Parameters | Description |
|---|---|
| GT | Horizontal distance between axis of symmetry and innermost point on sensor |
| M | Intersection of bottom plane of mirror and axis of symmetry |
| M' | M horizontally projected on mirror axis of symmetry |
| MO | Inner radius of bottom mirror |
| MS | Height of mirror |
| N | Number of sensors |
| O | Midpoint on bottom edge of mirror facet |
| P | Intersection of optical axis and mirror facet |
| PIV | Projected image length on bottom mirror edge (the length of mirror the sensor uses) |
| PBK | Projected image length from lens on top mirror edge (the length of mirror the sensor uses) |
| R | Point on lowest incoming ray closest to C |
| T | Intersection of sensor plane and mirror axis of symmetry |
| VFOV | Vertical field of view |
| X | Image sensor chip width |

The equations below relate to the camera geometry of the exemplary embodiment of the invention shown in FIG. 5 and define how given certain set of input variables, such as for example camera angles and mirror height, the other applicable parameters can be calculated in the camera design. This exemplary embodiment and associated camera geometry is provided by way of example only and is not meant to limit the invention in any way. Those skilled in the art will realize that the housing of optical material according to the invention can be used with many different camera configurations as long as the housing provides the desired optical properties. The more important parameters that are calculated in determining the optimum configuration for the camera for video conferencing are the height of mirror system H, the angle between the center axis of the camera and the horizon β, and the distance between the virtual centers of projection D.

In order to solve for the optimum height of the mirror, and the distance between virtual centers of projection of adjacent cameras, the angle between the camera center axis and the horizon can be calculated as follows:

$$\beta = 90 - (2\alpha + \chi)$$

where α is the angle of the mirror face and the vertical, and χ is the tilt of camera with respect to the vertical. The distance between the center of projection C and the bottom edge of the mirror, O, is calculated as:

$$CO = CO_x / \cos(90 - (VFOV/2 + \chi))$$

where $CO_x$ is the x coordinate of the center projection and VFOV is the vertical field of view. This yields the y coordinate of the center of projection, $CO_y$, as:

$$CO_y = \sqrt{CO^2 - CO_x^2}$$

The angles COP and CAO can be calculated as $$COP = 180 - (\alpha + VFOV/2 + \chi)$$

$$CAO = 180 - (VFOV + COP)$$

The distance between the top and bottom of the mirrors is:

$$AO = CO \sin(VFOV) / \sin(CAO)$$

which yields the height of the mirror system, MS, is:

$$MS = AO \cos(\alpha).$$

A series of calculations yield the coordinates of the intersection of camera center axis and mirror $PO_x$, $PO_y$, $$CPO = 180 - (COP + VFOV/2)$$

$$PO = CO \sin(VFOV/2)/\sin(CPO)$$

$$PO_x = PO \sin(\alpha)$$

$$PO_y = PO \cos(\alpha)$$

Once $PO_x$, $PO_y$, are found it is possible to find the x, and y coordinates of the virtual center of projection, $C'O_x$, $C'O_y$ of a given camera as, $$PC = PO \sin(COP)/\sin(VFOV/2)$$

$$PC' = PC$$

$$C'O_x = PC' \cos(\beta) - PO_x$$

$$C'O_y = PO_y - PC' \sin(\beta)$$

where PC is the distance between the point of intersection of the camera center axis and the mirror and the center of projection of the camera.

Performing these calculations for a set of adjacent cameras, yields the distance between the virtual centers of projection, D, for the set as, $$D = 2C'M' \sin(180/N).$$

where M' is the coordinate of the intersection of the bottom plane of the mirror and the axis of symmetry horizontally projected on the mirror axis of symmetry and N is the number of cameras.

Other parameters that are useful in designing a specific embodiment of the camera system include, the radius of the top, AS, which can be defined as:

$$AS = MO + MS \tan(\alpha)$$

and the lengths of the bottom and top mirror edges, IV, BK, which are given by:

$$IV = 2MO \tan(180/N)$$

$$BK = 2AS \tan(180/N).$$

The projected image length on the bottom and top mirror edges can be calculated as:

$$PIV = 2CO \tan(HFOV/2)$$

$$PBK = 2AC \tan(HFOV/2).$$

Similarly, the vertical distance between the midpoint of the mirror and the center of projection of the camera, AC, is given by:

$$AC = CO \sin(COP)/\sin(CAO).$$

In one tested embodiment of the invention, the foregoing equations were used to find the parameters needed to configure the omni-directional camera which satisfy the constraints of $\beta = 6$ degrees; a minimal height of the mirror system MS; a minimal top radius AS; and a distance between the virtual centers of projection of D<3 mm. This is highly configuration dependent. With different pixel sizes, it will change. In addition, the constraints of the projected image length on bottom mirror edge being less than the length of bottom mirror edge (PIV<IV) and the projected image length on the top of the mirror edge being less than the length of the top mirror edge (PBK<BK) were also imposed. The value of $\beta = 6$ degrees was selected as the angle that the cameras are tilted upward from the horizon and D<2.5 mm was selected to provide virtual center of projections in close enough to avoid stitching errors. It should be noted, however, that different values, depending on the camera height, sensors, and so on, can be used.

2.3.1 Vertical Field of View.

As seen in the description above, the vertical field of view is governed by the tilt angle of the camera relative to its corresponding reflective surface and the angle of the reflective surface. The N-sided mirror can be held above the cameras by the housing to provide an increasingly usable vertical field of view that captures the meeting participants sitting around the meeting room table or standing near it. Tilt angle $\beta$ is dictated by the tilting means. In one embodiment of the invention, it is preferred that this angle be between 6 and 8 degrees.

The up look or tilt angle can be implemented by tilting the camera, for example by using a wedge as was described in the previously mentioned co-pending application Ser. No. 10/608,363. This wedge can be incorporated into the optical housing.

However, the tilt angle can also be implemented by having a prism on the external (vertical) surface or the internal (horizontal) surface of the optical block housing. This method of up look angle allows the camera sensors to be positioned and mounted flat, which reduces complexity, cost, and calibrations while still providing the desired up look angle. Some chromatic aberration is induced (on the order of a pixel width), but this can be corrected via image processing.

In the embodiment of the invention shown in FIG. 3, each of the reflective sides preferably forms a 41 degree angle with a plane parallel to the base 316, and each camera forms a 6 degree angle with a plane parallel to the base 316. This arrangement allows for a small camera head size and a field of view that is 6 degrees above the horizon.

2.3.2 Horizontal Field of View

Figure 9:
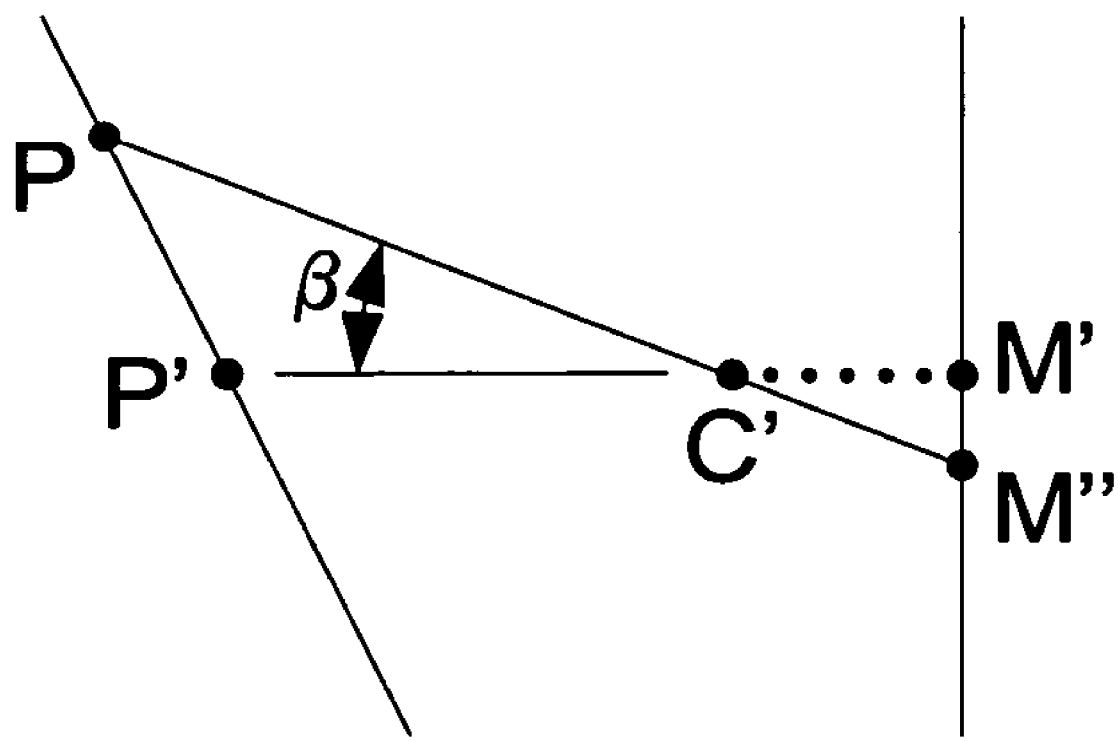
FIG. 9 depicts a portion of the geometry used in determining the minimum distance between the virtual centers of projection of adjacent cameras given the mirror facet size, location of COP, required HFOV, and border from the facet edge. Here M" is the intersection of PC' with the mirror axis of symmetry. P' is the intersection of C'M'.

Referring again to FIG. 3, each camera in this four-sided mirror embodiment has an effective 90 degree field of view in the horizontal direction. Since there are four cameras in this embodiment, the total horizontal view provided by the camera array is essentially 360 degrees. It should be noted that the actual field of view of each camera should be slightly larger to allow for image overlap between adjacent cameras to facilitate the stitching of the images into a panoramic image. When the centers of projection of the N cameras are moved away from the mirror axis of symmetry, then the horizontal field of view can be larger than 360/N, where N is the number of cameras. This is desirable so that the images the cameras capture overlap. The minimal D between centers of projection can be computed given the mirror facet size, location of the center of projection of each camera, required HFOV, and border from the facet edge. The mirror facet is shown in FIG. 9, and a cross section through point P is shown in FIG. 9. FIG. 9 depicts a portion of the geometry used in determining the minimum distance between the virtual centers of projection of adjacent cameras given the mirror facet size, location of COP, required HFOV, and border from the facet edge. Here M" is the intersection of PC' with the mirror axis of symmetry. P' is the intersection of C'M'. Minimal D can be computed as follows (referring to FIGS. 8 and 9):

1. $\angle HM'J < \angle H'C'J'$ if there is any overlap between cameras.
2. The overlap between cameras is $\angle H'C'J' - \angle HM'J$. Overlap requires moving C' away from M', and therefore D>0 if the overlap>0.
3. The beam width needs to be considered in the calculations. The beam width can be approximated as the pupil size on the facet. If the beam footprint is split by a facet edge, the resultant pixel will be a mixture of correct (vignetted) pixel and an incorrect beam coming from the wrong direction. There are two solutions for this:
a. Oversize the facet so that all beams are never split by the edge, yet still provide the required HFOV. In this case, the edge border δ should be the pupil radius.
b. Use vertical blinds on the mirror edge so that edge pixels are only vignetted but not split. The vignetting can be corrected for, but split pixel artifacts cannot. The primary advantage of using blinds is that δ can be zero and therefore D is minimized.

Consider the solution of over sizing the facets to avoid using vertical blinds. To compute the minimum D, one first computes the minimum C'M'.

$$H M'J = 360/N$$

$$H'C'J' = HFOV$$

$$P'C' = \frac{J'H'}{2\tan(H'C'J'/2)}$$

$$P'M' = \frac{J'H' + 2\delta}{2\tan(HM'J/2)}$$

$$C'M' = P'M' - P'C'$$

Combining the above equations gives:

$$C'M'_{min} = \frac{J'H' + 2\delta}{2\tan(180/N)} - \frac{J'H'}{2\tan(HFOV/2)}$$

then the minimum D is given by $$D_{min} = 2C'M'_{min} \sin(180/N)$$

This analysis uses the horizontal plane (defined by H, M', J) for simplicity. Non-horizontal planes should have similar results. In particular, if the mirror supports a horizontal viewing angle of HFOV for all vertical viewing angles, then the only difference in the analysis is slightly larger δ is required for the mirror extremes (B, K, I, V).

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Wherefore, what is claimed is:

1. A camera system comprising:
a unified solid block-structured housing entirely made of transparent optical material comprising sensor alignment surfaces for aligning one or more sensors with associated lens elements and reflective surfaces, said sensor alignment surfaces comprising holes cut out of the unified solid block-structured housing for receiving and aligning reflective surfaces and the lens elements, wherein said housing houses:
at least two reflective surfaces;
a lens associated with each said reflective surface and aligned to capture a reflected image in its associated reflective surface; and
a sensor aligned with each said reflective surface and associated lens.

2. The camera system of claim 1 wherein the housing further comprises an alignment surface to align each said associated lens and reflective surface.

3. The camera system of claim 1 wherein the housing further comprises alignment structures to align each said sensor with the associated lens.

4. The camera system of claim 3 wherein the alignment structures are pins.

5. The camera system of claim 1 wherein the housing further comprises a reflective alignment surface for each associated lens to align the reflective surface to capture the reflected image.

6. The camera system of claim 1 wherein each reflective surface is an alignment surface aligned to capture the reflected image.

7. The camera system of claim 1 wherein each reflective surface is back mirrored.

8. The camera system of claim 1 wherein each said lens is tilted upward relative to the horizontal to capture a more usable vertical field of view.

9. The camera system of claim 1 wherein the housing further comprises a prism on its vertical surfaces to capture a more usable vertical field of view.

10. The camera system of claim 1 wherein the housing further comprises a prism on its horizontal surfaces to capture a more usable vertical field of view.

11. The camera system of claim 1 wherein outer surfaces of said housing are curved.

12. The camera system of claim 1 wherein outer surfaces of said housing are planar.

13. A process of capturing video for teleconferencing and meeting recording, comprising the following process actions:
capturing images of an event in up to 360 degrees with a camera array, wherein said camera array comprises a unified solid molded structure entirely made of transparent optical material comprising sensor alignment surfaces molded into the unified molded structure for receiving and aligning an N-sided mirror located above N cameras arranged, each having a lens element and a sensor, equally spaced around the circumference of a circle in a circular fashion, and positioned to have a small distance between their virtual centers of projection, each capturing an image reflected in a different side of said N-sided mirror; and
stitching together said images captured by each of N cameras using a calibration surface to create a composite image.

14. The process of claim 13 wherein the unified molded structure further comprises alignment surfaces to align said associated lens element of each camera of the camera array and an associated mirror of the N-sided mirror.

15. The process of claim 13 wherein the unified molded structure further comprises alignment structures to align the sensor of each camera with the associated lens element.

16. The process of claim 15 wherein the alignment structures are pins.

17. The process of claim 13 wherein the unified molded structure of optical material further comprises corners and wherein the virtual centers of projection are offset to achieve overlap of the said N cameras horizontal field of view and not image the corners of the housing.

18. The process of claim 13 wherein the N-sided mirror is back mirrored.

19. The process of claim 13 wherein said lens element is tilted upward relative to the horizontal to capture a more usable vertical field of view.

20. The process of claim 19 wherein the unified molded structure further comprises a prism on its vertical surfaces to capture a more usable vertical field of view.

21. The process of claim 13 wherein the unified molded structure further comprises a prism on its horizontal surfaces to capture a more usable vertical field of view.

22. The process of claim 13 wherein each of said N cameras is a video sensor.

23. A camera system comprising:
a block-structured solid housing comprising sections entirely made of transparent optical material, comprising sensor alignment surfaces for aligning one or more sensors with associated lens elements and reflective surfaces, said sensor alignment surfaces comprising holes molded into the block-structured solid housing for receiving and aligning reflective surfaces and the lens elements and sensors, wherein said housing houses at least two reflective surfaces;
a lens element associated with each said at least two reflective surfaces and aligned to capture a reflected image in its associated reflective surface; and
a sensor aligned with each of said at least two reflective surfaces and associated lens elements.

24. The camera system of claim 23 wherein the housing is made of plastic.

25. The camera system of claim 23 wherein the housing is made of glass.

26. The camera system of claim 23 wherein each reflective surface associated with a lens and aligned sensor is configured so that the distance between the virtual center of projection of each reflective surface-lens-sensor set are offset to achieve an overlap between the horizontal field of view of adjacent reflective surface-lens-sensor sets while not imaging the corners of the housing.

27. A camera system comprising:
more than one camera comprising:
at least two reflective surfaces;
a lens element associated with each said at least two reflected surfaces and aligned to capture a reflected image in its associated reflective surface; and
a sensor aligned with each of said at least two reflective surfaces and associated lens elements; and
a unified solid block structure housing entirely made of transparent optical material encasing each said camera and providing desired optical qualities for capturing images using each said camera, and further comprising sensor alignment surfaces molded into the unified solid block structure housing for receiving and aligning reflective surfaces and the lens elements.

28. The camera system of claim 27 wherein said housing provides the desired optical path.

* * * * *